(12) United States Patent
Lauzon et al.

(10) Patent No.: US 6,510,266 B2
(45) Date of Patent: Jan. 21, 2003

(54) TUNABLE OPTOELECTRONIC FREQUENCY FILTER

(75) Inventors: Jocelyn Lauzon, Saint-Augustin-de-Desmaures (CA); Pierre-Yves Cortès, Sillery (CA)

(73) Assignee: Institut National D'Optique, Quebec (CA)

( * ) Notice: Subject to any disclaimer, the term of this patent is extended or adjusted under 35 U.S.C. 154(b) by 22 days.

(21) Appl. No.: 09/870,261

(22) Filed: May 30, 2001

(65) Prior Publication Data

US 2002/0181875 A1 Dec. 5, 2002

(51) Int. Cl.[7] ............................. G02B 6/26; G02B 6/42
(52) U.S. Cl. ............................. 385/40; 385/9; 385/50; 385/122; 385/41
(58) Field of Search ..................... 385/1–4, 8–10, 385/15, 14, 39–42, 37, 30, 27, 50, 122; 359/326, 328, 332, 245

(56) References Cited

U.S. PATENT DOCUMENTS

| 3,957,341 A | | 5/1976 | Taylor | |
| 4,645,293 A | | 2/1987 | Yoshida et al. | |
| 4,725,110 A | | 2/1988 | Glenn et al. | |
| 4,796,975 A | | 1/1989 | Lukas et al. | |
| 4,950,044 A | * | 8/1990 | Makita | 359/127 |
| 5,142,605 A | | 8/1992 | Diemeer et al. | |
| 5,193,023 A | | 3/1993 | Yamada et al. | 359/245 |
| 5,570,225 A | * | 10/1996 | Harada | 204/164 |
| 5,581,642 A | | 12/1996 | Deacon et al. | 385/15 |
| 5,764,831 A | | 6/1998 | Lauzon | 385/43 |
| 5,781,670 A | | 7/1998 | Deacon et al. | 385/10 |
| 5,887,089 A | | 3/1999 | Deacon et al. | 385/22 |
| 5,963,688 A | * | 10/1999 | Campi et al. | 385/50 |
| 6,118,908 A | | 9/2000 | Bischel et al. | |

FOREIGN PATENT DOCUMENTS

| EP | 0 545 401 A2 | 6/1993 |
| EP | 0 632 300 A1 | 1/1995 |

OTHER PUBLICATIONS

Thin Film LiNbO₃ Electro–Optic Light Modulator; Appl. Phys. Lett. vol. 22, No. 10, May 15, 1973.
Grating–Assisted InGaAsP/InP Vertical Codirectional Coupler Filter; Appl. Phys. Lett.55 (19) Nov. 6, 1989.
D. L. Staebler et al., "Coupled–wave analysis of holographic storage in LiNbO3", J. Appl. Phys., vol. 43 #3, Mar. 1972.

* cited by examiner

*Primary Examiner*—John D Lee
*Assistant Examiner*—Scott Knauss
(74) *Attorney, Agent, or Firm*—Merchant & Gould P.C.

(57) ABSTRACT

A wavelength tunable optolelectronic device. Two channel waveguides are provided in an optoelectronic structure made of a ferroelectric material. The waveguides are adjacent along at least a coupling region. A periodically poled structure is provided in the coupling region, and at least one of the waveguides is untouched by this structure. An electric field is applied in the coupling region, through both waveguides, to enable coupling a light of a given wavelength between the two waveguides. The amplitude of the electric field may be selected to tune the coupling wavelength. A third waveguide or more having a coupling region in common with the second waveguide may also be added to allow the bandwidth of the resulting beam to also be tuned.

20 Claims, 3 Drawing Sheets

TUNABLE OPTOELECTRONIC FREQUENCY FILTER

FIELD OF THE INVENTION

The present invention relates to optoelectronic devices and more particularly concerns such a device, simple in construction, and where the coupling wavelength between two waveguides is tunable.

BACKGROUND OF THE INVENTION

Optical devices such as wavelength add/drop filters, bandbass filters, directional couplers, etc. are crucial elements of optical communication systems. They are mainly used in DWDM (Dense Wavelength Division Multiplexing) applications, where efficient adding and dropping of channels is essential. In this context, a wavelength tunable add/drop/filter is very advantageous since it allows network reconfiguration. Such a device is also useful for wavelength routing of the signal. This characteristic is even more important for metro or access DWDM optical networks where reconfigurations are constant. The market of wavelength tunable bandpass filters is also important, where there is a great advantage to use a tunable filter with fast response time, integrated and with no moving parts (electronic control). An even more advantageous feature of a such a wavelength tunable device is that it may serve as the main building block of an integrated OADM (Optical Add/Drop Multiplexer) if it is combined with, or integrated to, the proper wavelength converter.

A wavelength tunable device is mentioned in U.S. Pat. No. 5,887,089 (Deacon et al). Deacon teaches a structure made of a ferroelectric material having good optoelectronic properties provided with channel waveguides therein. In one embodiment, shown in FIG. 10 of the above mentioned patent, where two adjacent waveguides lie in the structure and are provided with a periodically poled structure extending over both of them. Electrodes are provided on either side of the coupling region. When an electric field is applied between the electrodes, the refractive index grating defined by the poled structure is turned on, and coupling is allowed between the two waveguides for light of a given wavelength, determined by the propagation constants of the waveguides and the period of the grating.

In the above-mentioned patent, Deacon explores at length the possibility of tuning the coupling wavelength of such a device. To achieve such a result, one must operate an average refractive index change in the coupling region. To this end, Deacon suggests several techniques, such as using, in the periodic structure, alternate domains of optoelectronic and non-optoelectronic material, using an asymmetric grating to obtain a duty cycle different than 50%, depositing an additional optoelectronic layer over the basic structure, etc. All of the proposed solutions however involve a more complex and costly manufacturing process for the resulting device.

SUMMARY OF THE INVENTION

It is therefore an object of the present invention to provide a simple wavelength tunable optoelectronic device.

It is a secondary object of the present invention to provide such a device also allowing a tuning of the signal bandwidth.

Accordingly, the present invention provides a wavelength tunable optoelectronic device, including an optoelectronic structure made of a ferroelectric material. First and second channel waveguides are provided in the optoelectronic structure. The two waveguides are adjacent at least along a coupling region. A periodically poled structure is provided in this coupling region, and at least one of the first and second channel waveguides is untouched by this periodically poled structure.

The device also includes means for generating an electric field of selectable amplitude in the coupling region, through both the first and second waveguides. The electric field enables a coupling of light of a coupling wavelength between the first and second waveguides in said coupling region. The amplitude of the electric field in the waveguide untouched by the periodically poled structure determines the coupling wavelength.

According to an alternative embodiment of the present invention, there is also provided a wavelength and a bandwidth tunable optoelectronic device.

The device includes an optoelectronic structure made of a ferroelectric material. First, second and third channel waveguides are provided in this structure.

The first and second waveguides are adjacent at least along a first coupling region. A first periodically poled structure is provided in the first coupling region. At least one of the first and second channel waveguides is however untouched by the first periodically poled structure.

Similarly, the second and third waveguides are adjacent at least along a second coupling region, a second periodically poled structure being provided in the second coupling region, at least one of the second and third channel waveguides being untouched by said periodically poled structure.

Means are provided for generating a first electric field of selectable amplitude in the first coupling region, through both the first and second waveguides. The first electric field enables a coupling of light of a first coupling wavelength and first bandwidth between the first and second waveguides, in said first coupling region. The amplitude of the first electric field in the waveguide untouched by the first periodically poled structure determines the first coupling wavelength.

Means for generating a second electric field of selectable amplitude, in the second coupling region, through both the second and third waveguides, are also provided. The second electric field enables a coupling of light of a second coupling wavelength and a second bandwidth between the second and third waveguides in the second coupling region. The amplitude of the second electric field in the waveguide untouched by the second periodically poled structure determines the second coupling wavelength.

In this manner, the device enables a coupling of light of a tunable wavelength and tunable bandwidth from the first to the third waveguides.

Other features and advantages of the present invention will be better understood upon reading the description of preferred embodiments thereof with reference to the appended drawings.

DESCRIPTION OF PREFERRED EMBODIMENTS OF THE INVENTION

Figure 1:
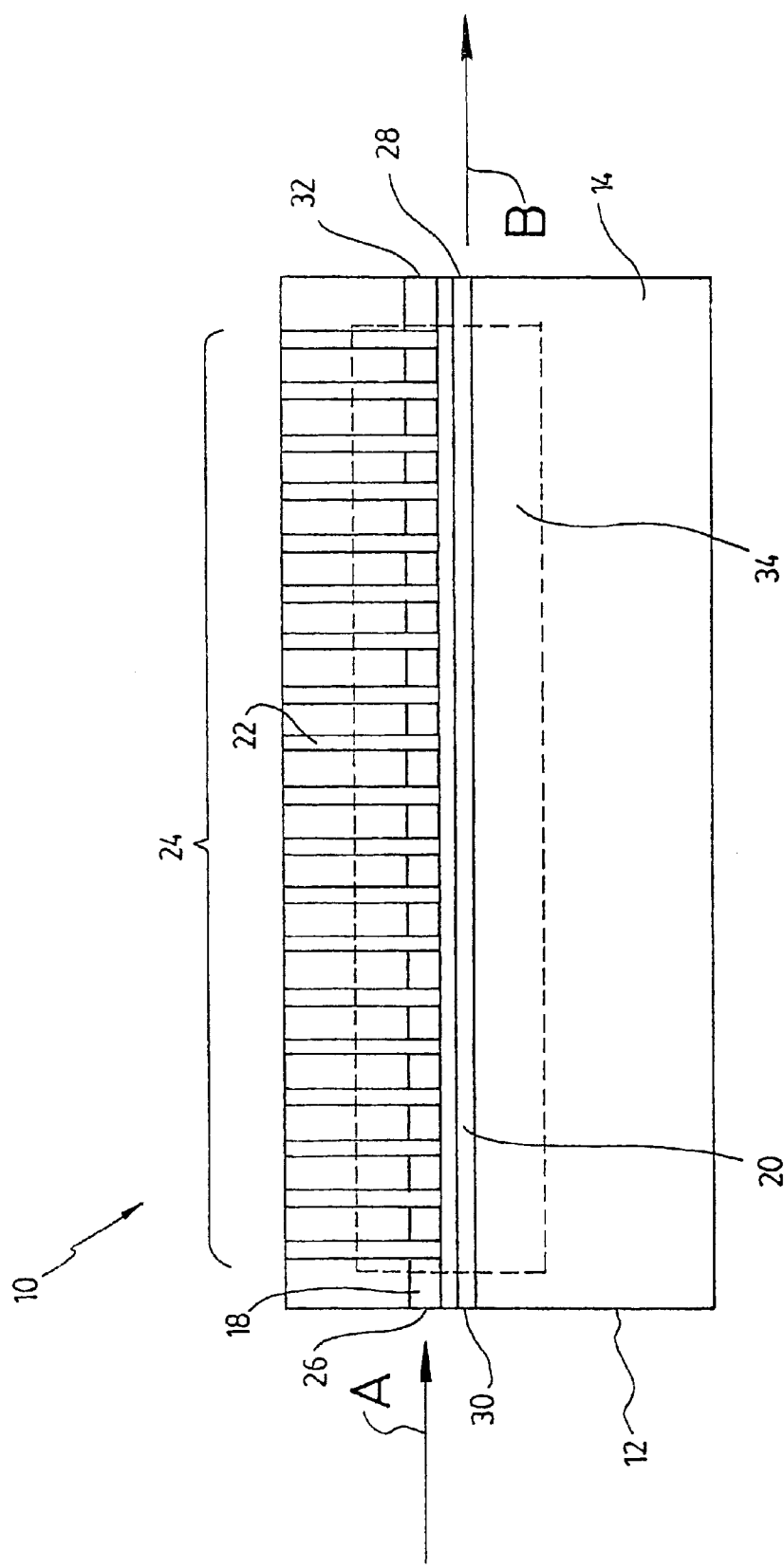
FIG. 1 is a schematic drawing of an optoelectronic device according to a first preferred embodiment of the invention.

Referring to FIG. 1, there is shown a wavelength tunable optoelectronic device 10 according to a first preferred embodiment of the invention.

The device 10 is built into an optoelectronic structure 12, which is made of a ferroelectric material. In the preferred embodiment, this material is a $LiNbO_3$ crystal 14 having good optoelectronic properties in its x-cut propagated along y direction. A first and a second channel waveguide 18 and 20 are provided in the optoelectronic structure 12. The channel waveguides are preferably singlemode waveguides, and may be made for example by titanium in-diffusion or proton exchange. The two waveguides 18 and 20 preferably have different widths so that their propagation constants are different at rest. They are adjacent along at least a portion thereof, defining a coupling region 24.

A periodically poled structure 22 is provided in the coupling region 24. It may extend in any appropriate portion of the coupling region where it will allow light coupling between the two waveguides 18 and 20, but at least one of these waveguides should be untouched by the periodically poled structure 22, for reasons explained below. Known high voltage periodic poling techniques may be used to make the poled structure 22, such as those disclosed in U.S. Pat. No. 5,193,023 (Masahiro et al) and in co-pending application Ser. No. 09/796,832 filed on Mar. 1$^{st}$, 2001. In the illustrated embodiment, the periodically poled structure 22 extends over almost all of the first waveguide 18, which is parallel and proximate to the second waveguide 20 along its entire length. However, for other embodiments it may be advantageous to have the periodically poled structure 22 on only a portion of one of the waveguides. It may also extend in between the two waveguides, partly on one waveguide and in between the waveguide, etc, but one of the waveguides should always be free of contact with the periodically poled structure 22.

The device 10 includes means for generating an electric field in the coupling region 24, preferably embodied by a pair of electrodes 34. In the illustrated embodiment, the two electrodes respectively extend over and under the optoelectronic structures on either side of the coupling region 24. The electric field extends through both waveguides 18 and 20. Its effect is two-fold. First, it will photo-induce a phase matching grating in the periodically poled structure 22, creating a phase-matching condition between the two waveguides for a wavelength range defined by:

$$\Lambda = \frac{2\pi}{(\beta_1 - \beta_2)}$$

where $$\beta = \frac{2\pi n_{eff}}{\lambda}$$

$\Lambda$ is the period of the periodically poled structure 22, and $\beta_{1,2}$ is the propagation constant of the first or second waveguides 18 and 20, which depend on the coupling wavelength $\lambda$ and the average refractive index $n_{eff}$ in the coupling region. Activating the grating will therefore enable a coupling of light of wavelength $\lambda$ between the two waveguides. Secondly, the electric field will modify the refractive index in the coupling region. In the periodically poled structure, the effective change in the alternating domains will cancel each other out, not affecting the average refractive index in the region. However, the untouched waveguide being free of such periodic structure, the average value of its refractive index will be changed by the electric field, depending on the field's strength. By selecting the amplitude of the electric field in this waveguide, one can therefore change the value of $n_{eff}$, and in this manner change the wavelength for which coupling is enabled. It is a highly advantageous aspect of the present invention that wavelength tuning of the device is provided by simply changing the strength of the electric field applied.

Figure 2:
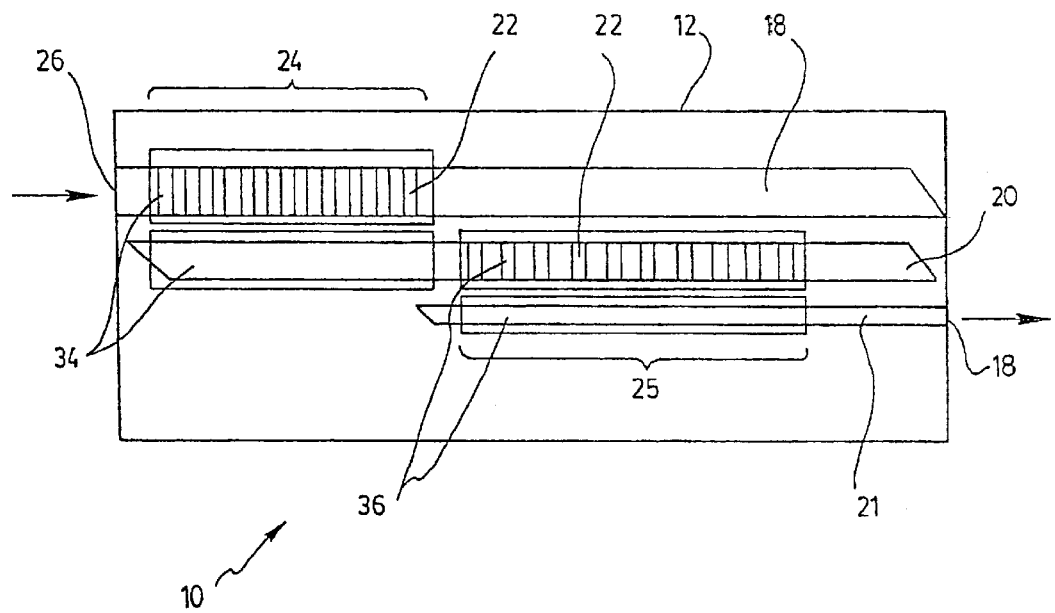
FIG. 2 is a schematic drawing of an optoelectronic device according to a second preferred embodiment of the invention.

It should be noted that the present invention is not limited to the electrode configuration illustrated above, but includes all appropriate means of generating the needed electric field. For example, as shown in the embodiment of FIG. 2, two pairs of electrodes could be provided for each coupling region, a first pair extending on either side of the first waveguide, and a second pair extending on either side of the second waveguide. This configuration advantageously allows to generate an electric field of different values in each waveguide. Alternatively, the electrodes could be co-lateral, or the electric field could be produced by a more elaborate structure. It is understood that the expression "electric field" used herein could be a combination of several field components applied in different regions.

In the preferred embodiment, a first input 26 is connected to the first waveguide, assuming it is the one provided with the periodically poled structure 22, upstream the coupling region 24. The first input 26 is for receiving, in operation, an incoming light beam A. A first output 28 is similarly connected to the second waveguide 20, downstream the coupling region 24, for exiting a light beam B resulting from the filtering operation of the device 10. Also preferably, a second input 30 and a second output 32 may respectively be connected to the second waveguide 20 upstream the coupling region and to the first waveguide 18 downstream the coupling region, if needed by the intended use of the device 10. Of course, all inputs and outputs may be fiber pigtailed in order to be useful for optical communication applications. The extremities of the waveguides 18 and 20 connected to the second output and input may also be left free, in which case they are preferably angled at more than 10° to eliminate back reflections in the waveguides.

Referring to FIGS. 2, 3A, 3B and 3C, there is shown a second embodiment of the present invention where the bandwidth of the coupled beam is also tunable.

In this embodiment, the optoelectronic structure 12 is provided with a third waveguide 21 in addition to first and second waveguides 18 and 20. Of course, aditional waveguides could be added to the optoelectronic structure 12, if needed. A first coupling region 24 is provided in the first and second waveguides 18 and 20, as before, and a second coupling region 25, similar to the first one, is here provided in the second and third waveguides 20 and 21. In both coupling regions, only one of the waveguides involved is provided with a periodic poled structure 22. The periodic structure is preferably of a short length, preferably of less than 10 mm, which results in a relatively large bandwidth of the coupled signal, of the order of 10 nm or larger.

Means for generating a first electric field, in the first coupling region, are provided and preferably include pairs of electrodes 36 and 38, respectively disposed on either side of the first and second waveguides. Similarly, a second electric field is generated in the second coupling region by pairs of electrodes 40 and 42. The amplitude of both electric fields is adjustable to tune the coupling wavelength of each coupling region independently.

Figure 3A:
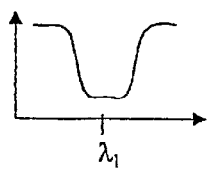
FIG. 3A is a diagram showing the wavelength distribution at the coupling between the first and second waveguides of FIG. 2.
Figure 3B:
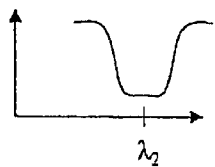
FIG. 3B is a diagram showing the wavelength distribution at the coupling between the second and third waveguides of FIG. 2.
Figure 3C:
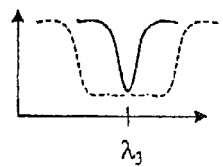
FIG. 3C is a diagram showing the resulting wavelength and bandwidth of light coupled from the first to the third waveguides of the device of FIG. 2.

In operation, a multiwavelength optical signal is inserted into input 26 of the first waveguide 18. In the first coupling region 24, a portion of the input beam centered on a first coupling wavelength, and having a first bandwidth determined by the grating's geometry, is coupled from the first to the second waveguides 18 and 20. The spectral profile of the resulting beam propagating in the second waveguide 20 is schematized in FIG. 3A. When it reaches the second coupling region 25, a portion of this beam centered on a second coupling wavelength and having a second bandwidth is coupled into the third waveguide 21, from which it exits at output 28. FIG. 3B shows the coupling spectral shape of the second coupling region, and FIG. 3C shows the superposition of the graphs of FIGS. 3A and 3B, and the spectral shape of the resulting beam coupled from the first to the third waveguides 18 and 21.

As can be seen, both the coupling wavelength and the bandwidth of the output beam will simply depend on the overlap between the bandwidths of the first and second coupling regions 24 and 25. The bandwidths being fixed values, both parameters are easily controlled by simply calculating the required values of the first and second coupling wavelengths, and setting the amplitude of the first and second electric fields accordingly.

Figure 4:
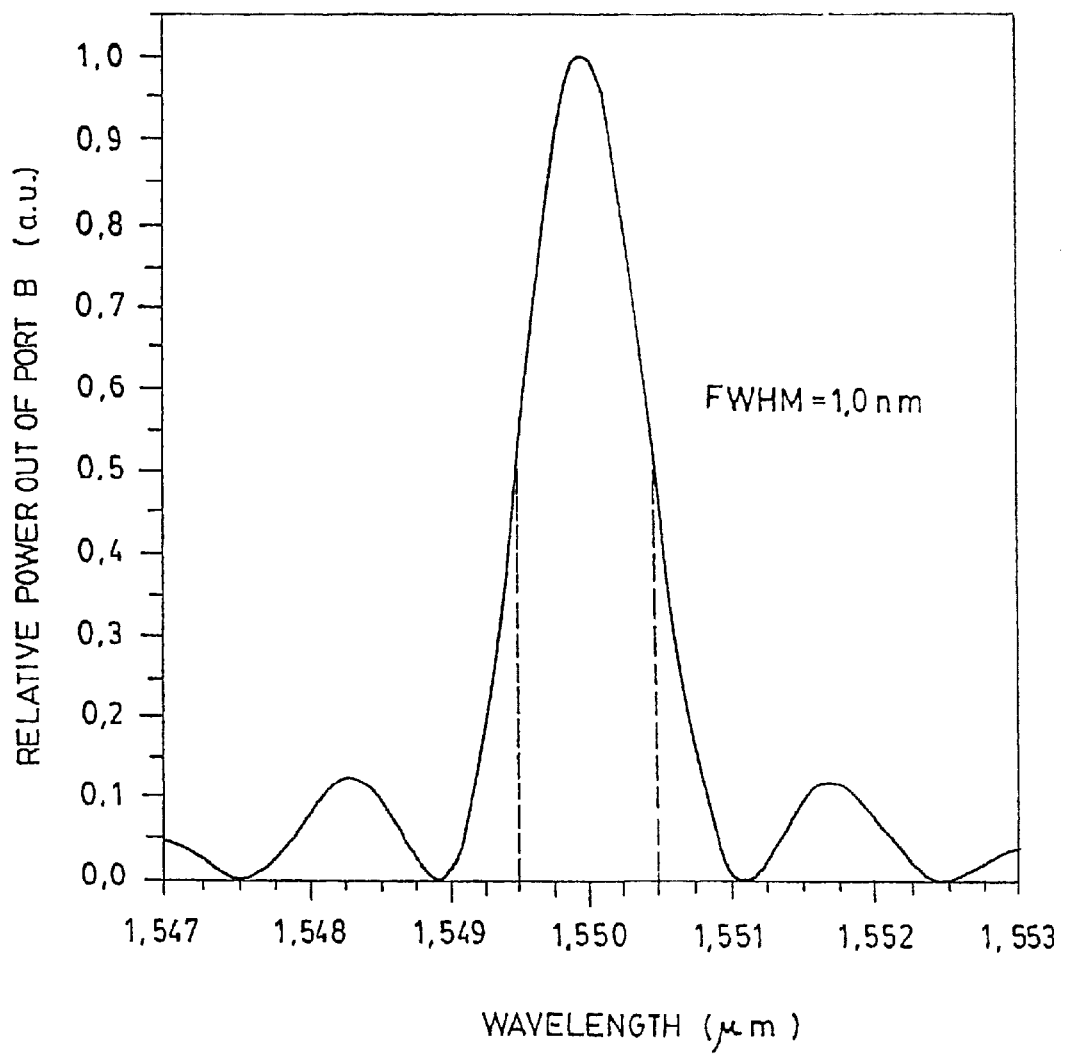
FIG. 4 shows the spectral distribution for a device according to the embodiment of FIG. 1.

Referring to FIG. 4, there is shown an example of the expected response of a device according to FIG. 1, when used to filter into output 28 a spectral portion of a beam incident at input 26. In this case, the interaction length between the first and second waveguides is taken to be approximately 25 mm, the distance between the waveguides is set to about 2 $\mu$m, $\Delta\beta$ to 6300 cm$^{-1}$ and $\Lambda$ to approximately 10 $\mu$m. The periodically poled structure is made by using a voltage of 12 kV on a 0.5 mm LiNbO$_3$ wafer for about 1 second. The expected tunability is of 30 nm for an operational voltage of approximately 20 V.

One skilled in the art will readily understand that devices as described above have many applications in the field of optical communications. For example, in a simple embodiment it may serve as a bandpass filter where only the first input 26 and first output 28 are provided. Alternatively a second input 30 and second output 32 may be used to make a bi-directional add/drop filter, or a directional coupler where a signal of a given wavelength may be routed to either output 28 or 32 by choosing the proper voltage. In the two latter cases, it may be advantageous to choose a geometry where the waveguides are apart at both ends and are curved so as to come together over the coupling region only. In another potential application, a device according to the present invention may be used in an optical attenuator where the optical power output of a signal may be changed by tuning in or out a certain wavelength range therefrom. Other possible applications include a wavelength selective optical switch, an optical modulator, etc.

Of course numerous changes could be made to the embodiments described above without departing from the scope of the invention as defined in the appended claims.

What is claimed is:

1. A wavelength tunable optoelectronic device, comprising:
    an optoelectronic structure made of a ferroelectric material;
    a first and a second channel waveguide provided in the optoelectronic structure, the first and second waveguides being adjacent at least along a coupling region, a periodically poled structure being provided in said coupling region, at least one of the first and second channel waveguides being untouched by said periodically poled structure; and
    means for generating an electric field of a selectable amplitude in the coupling region through both the first and second waveguides, the electric field enabling a coupling of light of a coupling wavelength between the first and second waveguides in said coupling region, the amplitude of said electric field in the untouched waveguide determining the coupling wavelength.

2. An optoelectronic device according to claim 1, wherein the means for generating an electric field comprises a pair of electrodes.

3. An optoelectronic device according to claim 2, wherein said electrodes respectively extend over and under the optoelectronic structure, the coupling region extending therebetween.

4. An optoelectronic device according to claim 1, wherein the means for generating an electric field comprise:
    a first pair of electrodes respectively extending over and under the optoelectronic structure, a portion of the first waveguide, in the coupling region, extending therebetween; and
    a second pair of electrodes respectively extending over and under the optoelectronic structure, a portion of the second waveguide, in the coupling region, extending therebetween.

5. An optoelectronic device according to claim 1, further comprising:
    a first input connected to the first waveguide upstream the coupling region; and
    a first output connected to the second waveguide downstream the coupling region.

6. An optoelectronic device according to claim 5, further comprising a second output connected to the first waveguide downstream the coupling region.

7. An optoelectronic device according to claim 6, further comprising a second input connected to the second waveguide upstream the coupling region.

8. An optoelectronic device according to claim 1, wherein said ferroelectric material is a LiNbO$_3$ crystal.

9. An optoelectronic device according to claim 1, wherein said first and second waveguides are singlemode waveguides.

10. Use of an optoelectronic device according to claim 1 as a bandpass filter.

11. Use of an optoelectronic device according to claim 1 as an add/drop filter.

12. Use of an optoelectronic device according to claim 1 as a directional coupler.

13. Use of an optoelectronic device according to claim 1 as an optical switch.

14. Use of an optoelectronic device according to claim 1 as an optical modulator.

15. A wavelength and bandwidth tunable optoelectronic device, comprising:
    an optoelectronic structure made of a ferroelectric material;
    a first, a second and a third channel waveguide provided in the optoelectronic structure, the first and second waveguides being adjacent at least along a first coupling region, a first periodically poled structure being provided in said first coupling region, at least one of the first and second channel waveguides being untouched by said periodically poled structure, the second and third waveguides being adjacent at least along a second coupling region, a second periodically poled structure being provided in said second coupling region, at least one of the second and third channel waveguides being untouched by said periodically poled structure;

means for generating a first electric field of a selectable amplitude in the first coupling region through both the first and second waveguides, the first electric field enabling a coupling of light of a first coupling wavelength and first bandwidth between the first and second waveguides in said first coupling region, the amplitude of said first electric field in the waveguide untouched by the first periodically poled structure determining the first coupling wavelength; and means for generating a second electric field of a selectable amplitude in the second coupling region through both the second and third waveguides, the second electric field enabling a coupling of light of a second coupling wavelength and second bandwidth between the second and third waveguides in said second coupling region, the amplitude of said second electric field in the waveguide untouched by the second periodically poled structure determining the second coupling wavelength;

the device thereby enabling a coupling of light of a tunable wavelength and tunable bandwidth from the first to the third waveguide.

16. An optoelectronic device according to claim 15, wherein each of the means for generating the first and the second electric fields comprises at least one pair of electrodes.

17. An optoelectronic device according to claim 15, wherein:

the means for generating a first electric field comprise a first pair of electrodes respectively extending over and under the optoelectronic structure, the first coupling region extending therebetween; and the means for generating a second electric field comprise a second pair of electrodes respectively extending over and under the optoelectronic structure, the second coupling region extending therebetween.

18. An optoelectronic device according to claim 15, further comprising:

a first input connected to the first waveguide upstream the first coupling region; and a first output connected to the third waveguide downstream the second coupling region.

19. An optoelectronic device according to claim 15, wherein said ferroelectric material is a $LiNbO_3$ crystal.

20. An optoelectronic device according to claim 15, wherein said first, second and third waveguides are singlemode waveguides.

* * * * *